(12) United States Patent
Van Esch

(10) Patent No.: US 8,558,997 B2
(45) Date of Patent: Oct. 15, 2013

(54) DOOR LATCH MISALIGNMENT MEASURING ARRANGEMENT AND METHOD

(76) Inventor: Tom Van Esch, Waterford, MI (US)

( * ) Notice: Subject to any disclaimer, the term of this patent is extended or adjusted under 35 U.S.C. 154(b) by 369 days.

(21) Appl. No.: 13/017,119

(22) Filed: Jan. 31, 2011

(65) Prior Publication Data

US 2011/0188024 A1    Aug. 4, 2011

Related U.S. Application Data

(60) Provisional application No. 61/300,483, filed on Feb. 2, 2010.

(51) Int. Cl.
*G01C 1/06* (2006.01)

(52) U.S. Cl.
USPC .............................. 356/139; 356/4.01; 356/28

(58) Field of Classification Search
USPC ............ 356/3.01–22, 28, 28.5, 139.01–139.1
See application file for complete search history.

(56) References Cited

U.S. PATENT DOCUMENTS

| 4,870,290 | A | | 9/1989 | Deck |
| 5,214,293 | A | * | 5/1993 | MacNiel .................. 250/559.29 |
| 6,062,079 | A | | 5/2000 | Stewart |
| 7,545,486 | B1 | * | 6/2009 | Deschutter et al. ............. 356/28 |
| 2008/0106397 | A1 | | 5/2008 | Van Esch |

FOREIGN PATENT DOCUMENTS

| JP | 05-269648 | 10/1993 |
| JP | 09-076005 | 3/1997 |

* cited by examiner

*Primary Examiner* — Luke Ratcliffe
(74) *Attorney, Agent, or Firm* — John R. Benefiel

(57) ABSTRACT

A pair of laser distance sensors are arranged to impinge a respective laser beam on a respective one of a pair of surfaces on a reference target installed on a car door to determine the extent of misalignment of a door latch and striker by determining the extent of any vertical door movement induced by such misalignment. The use of oppositely inclined surfaces eliminates the effect of small mispositioning of the reference target surfaces and the laser distance sensors. A side by side arrangement of the laser distance sensors can also be used to determine the door closing speed.

15 Claims, 4 Drawing Sheets

DOOR LATCH MISALIGNMENT MEASURING ARRANGEMENT AND METHOD

CROSS REFERENCE TO RELATED APPLICATIONS

This application claims the benefit of U.S. provisional patent application No. 61/300,483, filed on Feb. 2, 2010, incorporated by reference herein. U.S. patent application Ser. No. 12/971,009 filed on Dec. 17, 2010 is also incorporated by reference herein.

BACKGROUND OF THE INVENTION

In automobile production it is usual to the carry out inspections of car doors to insure proper operation and to enable adjustments or repairs to be made. These inspections desirably should be able to be carried out quickly as well as accurately due to time constraints in the production environment.

One such inspection is of proper door closing which requires good alignment of the striker and latch components in order to have the desired closing characteristics. The door closing speed necessary to operate the latch mechanism is another such inspection and an arrangement for determining this is described in copending U.S. patent application Ser. No. 12/971,009 referenced above.

Some equipment for inspections of this type require a precision set up of sensors and targets on the car which is time consuming to properly align and leads to errors if the necessary alignment is not accomplished during set up.

Such inspections should not require disassembly of the involved door parts.

It is an object of the present invention to provide an arrangement and method for measuring any misalignment between an automobile door striker and latch which can be carried out rapidly including the time necessary for set up and removal of the test equipment.

SUMMARY OF THE INVENTION

The above recited object and other objects of the present invention which will be understood upon a reading of the following specification and claims are achieved by an arrangement and method including dual laser distance sensors and a separate reference target which is attached to the door.

The reference target has a pair of surfaces thereon preferably oppositely inclined from the vertical, and a laser beam from each laser distance sensor is aimed at a respective surface to impinge a laser beam thereon as the door moves past the sensors to a closed fully latched condition. The points of impingement on the surfaces shift in a vertical direction if a misalignment exists and due to the surface inclination, the distance from the respective laser sensor changes correspondingly.

That is, if the latch and striker are misaligned, the door moves slightly vertically as the striker moves into the latch opening, and the extent of vertical movement is determined from the change in distance to the points of impingement in providing a measure of the extent of misalignment.

The laser distance sensors generate signals corresponding to the extent of vertical movement by detecting the change in distance to the points of impingement of the laser beams on the respective surfaces of the respective target surfaces as the reference target and laser sensor relatively shift in position along the vertical axis. The corresponding display and/or recording of these signals thus provides data corresponding to the degree of misalignment for quality control purposes and/or the making of corrective adjustments to the door latch mechanism.

The change in distance to impingement points on the respective target surfaces preferably varies inversely so that misalignments of the target and laser sensor are compensated for to minimize the degree of precision required in aligning the target and the dual laser sensor.

The laser distance sensors can be arranged in vertically stacked or in a side by side relationship.

With a side by side arrangement, the dual laser sensor unit can also measure the door closing speed by detecting the movement of the door edge successively past each laser sensor and measuring the time elapsed as the door edge moves past the two laser sensors successively.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
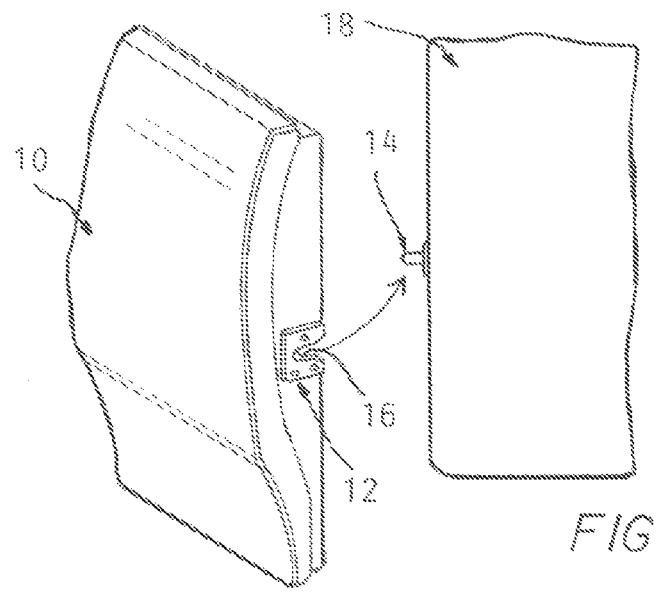
FIG. 1 is pictorial fragmentary view of an auto door and adjacent body structure showing the door striker and latch

Referring to the drawings, FIG. 1 shows a typical automobile door 10, having a latch component 12 on the end, and a striker 14 fixed to the adjacent body structure 16.

The latch 12 has a wedge shaped opening 16 which receives the striker 14 when the door closes, causing a secure capture of the striker 14 when the door 10 is fully closed in the well known manner.

Figure 2A:
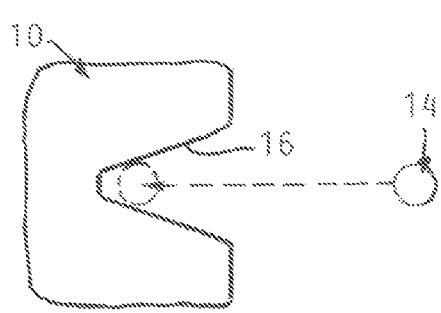
FIGS. 2A and 2B are diagrammatic depictions of the movement together of the striker and latch in the aligned and misaligned conditions respectively.
Figure 2B:
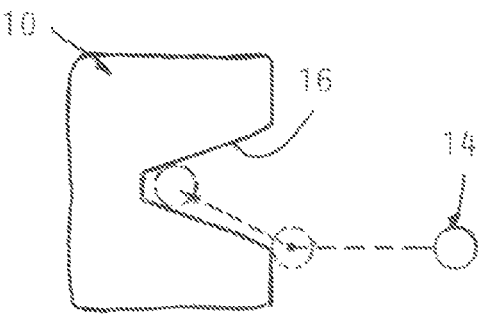

FIGS. 2A and 2B depict the striker 14 moving into the latch opening 16 on the door closes. The striker 14 should be centered on the opening 16 as shown in FIG. 2A. If the striker 14 is misaligned as shown in FIG. 2B, the door 10 is cammed up (or down) as it closes due to the wedge shape of the opening 16.

Excessive misalignment requires an excessive speed of door closing to latch the striker 14, and thus the door operation is inspected during production to determine if excessive misalignment exist. Suitable adjustments can correct the problems, or component replacement may be necessary.

The production process requires that such inspection be carried out quickly and reliably, and disassembly of components cannot be required. Similarly the set up and removal of test componenting must both be able to be carried out quickly.

Figure 3:
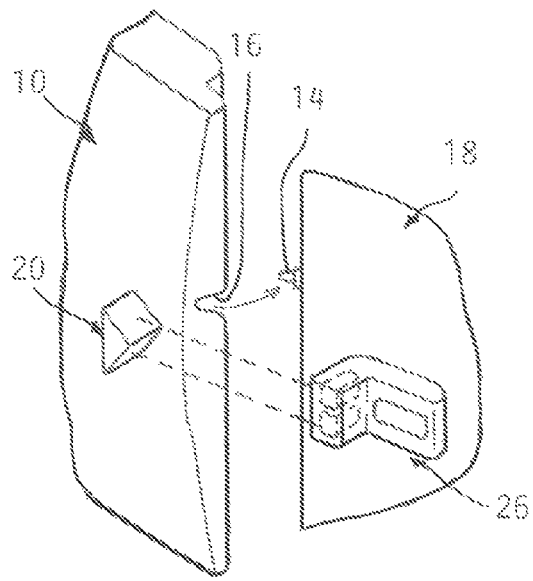
FIG. 3 is a pictorial fragmentary view of an auto door and adjacent body structure with a reference target installed on the door outer surface and a dual laser distance sensor unit held to the adjacent body surface.
Figure 10:
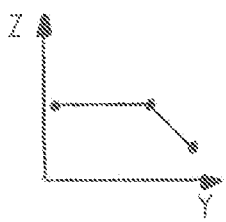
FIG. 10 is a plot of the vertical position of the reference target versus the horizontal position during a door closing cycle with the striker and latch misaligned and the reference target mispositioned in the manner indicated in FIG. 9.
Figure 10A:
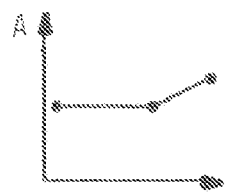
FIGS. 10A and 10B are plots of the respective dual laser distance sensor unit readings in the reference target condition shown in FIG. 10 and with a misaligned striker and latch.
Figure 10B:
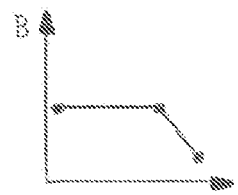

FIG. 3 shows a basic test set up according to the present invention, which relies on the fact that the degree of misalignment corresponds to the extent of vertical movement of the door as it comes to a fully closed state to the upper sensor 28A as seen in FIG. 10A.

The arrangement includes a reference target 20 detachably affixed to the door 10 adjacent the far side remote from the hinges as by a magnetic or vacuum holder (not shown).

Figure 4:
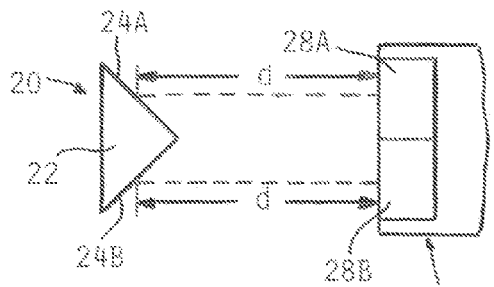
FIG. 4 is an elevational diagrammatic view of the reference target and dual laser distance sensor unit showing the relationship of the laser beams and respective surfaces on the target.
Figure 5:
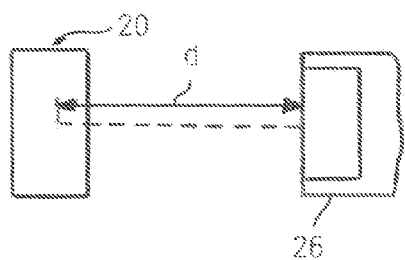
FIG. 5 is a top diagrammatic view of the reference target and dual laser distance sensor unit shown in FIG. 4.
Figure 6:
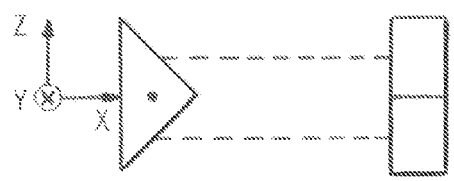
FIG. 6 is a diagrammatic representation of the reference target and sensor unit with orthogonal axes of movement indicated thereon.

The reference target comprises a body 22 which has a triangular in section shape, with oppositely inclined from the vertical planar surfaces 24A, 24B (FIG. 4) facing a dual laser sensor unit 26.

The dual laser sensor unit 26 comprises a pair of laser distance sensors 28A, 28B stacked vertically.

The unit 26 is of a type described in copending, U.S. pending application Ser. No. 12/971,009 referenced above. Each laser distance sensor 28A, 28B includes a laser beam source which directs a beam at a respective surface 28A, 28B, and a light sensitive element such as a ccd equipped with a focusing optic receiving reflected light from the respective surface 28A, 28B and generating corresponding signals. These signals are processed in a signal processor to calculate the distance d by the well known laser triangulation process. Such devices are well known and commercially readily available.

In the present described arrangement, the sensors 28A, 28B are stacked vertically one atop the other so as to each be aligned with a respective surface 24A, 24B of the reference target 20.

As the door swings closed, the laser beams from the sensors 28A, 28B move substantially horizontally along the y axis across the inclined surfaces 24A, 24B if the latch 12 and striker 14 are aligned.

Figure 7:
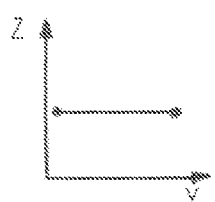
FIG. 7 is a plot of the relative vertical positions of the reference target when passing the sensors the striker and latch properly aligned.

Further the vertical location of the reference target 20 remains constant relative the sensor unit 26 as indicated in FIG. 7.

Figure 7A:
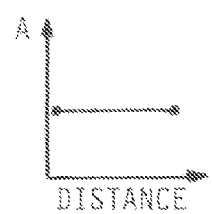
FIGS. 7A and 7B are plots of each laser distance sensor readings during closing door movement with the striker and latch aligned.
Figure 7B:
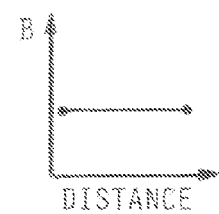

Furthermore, the distance d from each sensor 28A, 28B to the point of impingement remains constant as indicated in FIG. 7A, 7B.

Figure 8:
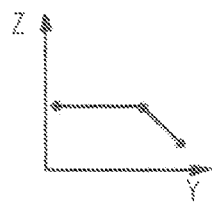
FIG. 8 is a plot of vertical positions versus horizontal positions of the reference target with a misaligned striker and latch.

However, if the latch 12 and striker 14 move relative each other in a vertical direction due to a misalignment therebetween, the vertical location of the reference target 20 relative the sensor unit 26 will change, i.e. rise or drop relative the sensor unit 26 depending on the direction of misalignment, after the striker 14 engages one of the surfaces defining latch opening 16. This is indicated in FIG. 8.

Figure 8A:
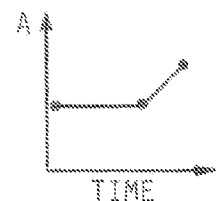
FIGS. 8A and 8B are plots of respective laser distance sensor readings during door closing motion with a misaligned striker and latch and a correctly aligned reference target as indicated in FIG. 6.
Figure 8B:
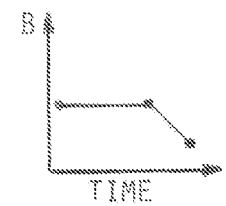

Due to the opposite vertical inclination of the surfaces 24A, 24B, the distances between sensor 28A and the opposite points on the surface 24A will increase since the points of impingement will be at a point on the surface 24A further above the center, and between sensor 28B and surface 24B will be decrease since the points of impingement will be closer to the center of the reference target 20, as seen in FIGS. 8A and 8B.

The use of dual sensors 28A, 28B compensates for minor mispositioning of the reference target 20 relative the sensor unit 26 to make set up of the reference target 20 quicker and easier.

Figure 9:
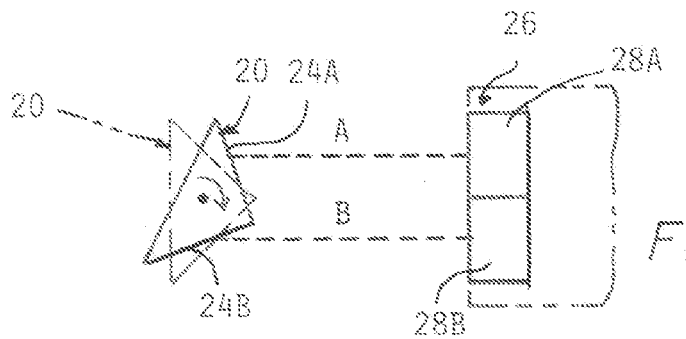
FIG. 9 is an elevational diagram of the relative position of a reference target which is mispositioned slightly by being rotated about a transverse axis.

FIG. 9 shows the reference target 20 tilted towards the sensor unit 26. If the reference target 20 drops (or rises) relative the sensor unit 26 as the striker 14 engages the latch 12 due to misalignment of the striker 14 and latch opening 16, the rotated position of the reference target 20 affects the distances sensed by the sensors 28A, 28B. Since the upper surface 24A becomes more steeply inclined from the vertical as seen in FIG. 9, a given increment of vertical motion produces a reduced distance change from the surface 24A.

On the other hand, the change in distance from surface 24B to sensor 28B is greater due to the shallower inclination from the vertical of surface 24B. However, the calculated drop distance and extent of misalignment will remain the same and can be computed from the A and B distance changes.

Figure 11:
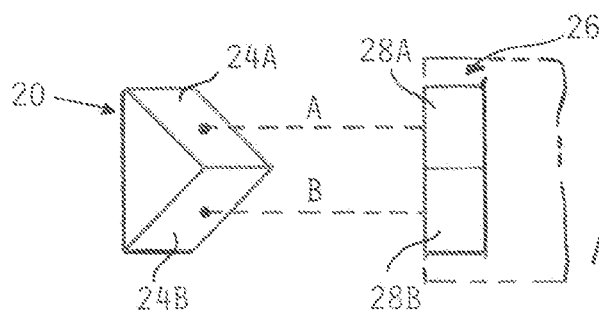
FIG. 11 is an elevational diagrammatic view of a reference target and dual laser distance sensor unit with the reference target rotated out of an aligned position.
Figure 12:
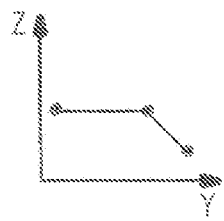
FIG. 12 is a plot showing the relationship between the relative vertical position of the reference target and dual laser distance sensor unit as the reference target and sensor unit move past each other if the door closes when the striker and latch are misaligned and the reference target is rotated about a vertical axis from an aligned position.
Figure 12A:
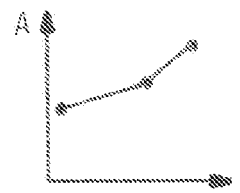
FIGS. 12A and 12B are plots of the distance to the respective points of impingements of each laser sensor beam on the reference target with the conditions represented in FIGS. 11 and 12.
Figure 12B:
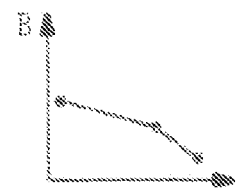

FIG. 11 shows the reference target 20 rotated about a vertical axis to be skewed with the sensor unit 26. As the door 10 swings past the sensor unit 26, the sensed distances to the points of impingement on the surfaces 24A, 24B will change continuously even prior to the engagement of the striker 14 since the point of impingement of the sensor beams will be gradually ascending the surfaces 24A and 24B, causing an increasing distance A and decreasing distance B to the respective points of impingement on the surfaces 24A, 24B as seen in FIGS. 12A and 12B. However, after the inflection point is reached by engagement of a misaligned latch 16 and striker 14, the distance change due to the vertical door motion can still be computed by summing the A and B change in distance to determine the degree of misalignment.

The laser distance sensors can be located side by side rather than stacked as in the embodiment described above. This has the advantage of allowing the door closing speed to also be determined by the same sensor.

Figure 13:
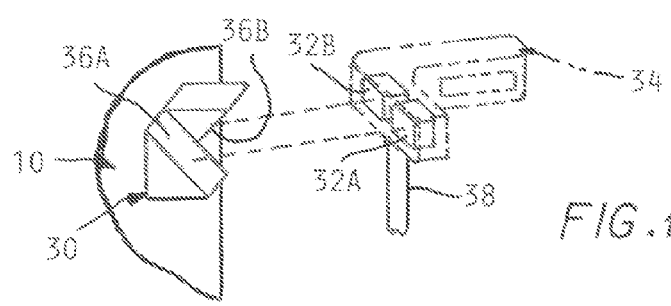
FIG. 13 is a pictorial view of an aligned modified reference target and a second embodiment of a dual laser sensor unit in which the dual distance laser sensors are positioned side by side rather than vertically stacked.

FIG. 13 shows the change in configuration of the reference target 30 when using side by side sensors 32A, 32B in a sensor unit 34.

The reference target 30 is comprised of side by side surfaces 36A, 36B each inclined to the vertical but in opposite directions. The two laser sensor 32A, 32B are sufficiently aligned with a respective surface 36A, 36B so as to direct a laser beam to impinge on a respective surface.

The sensor unit 34 may optionally be supported on a separate stand 38 positioned alongside the auto body 18 as shown.

Figure 14:
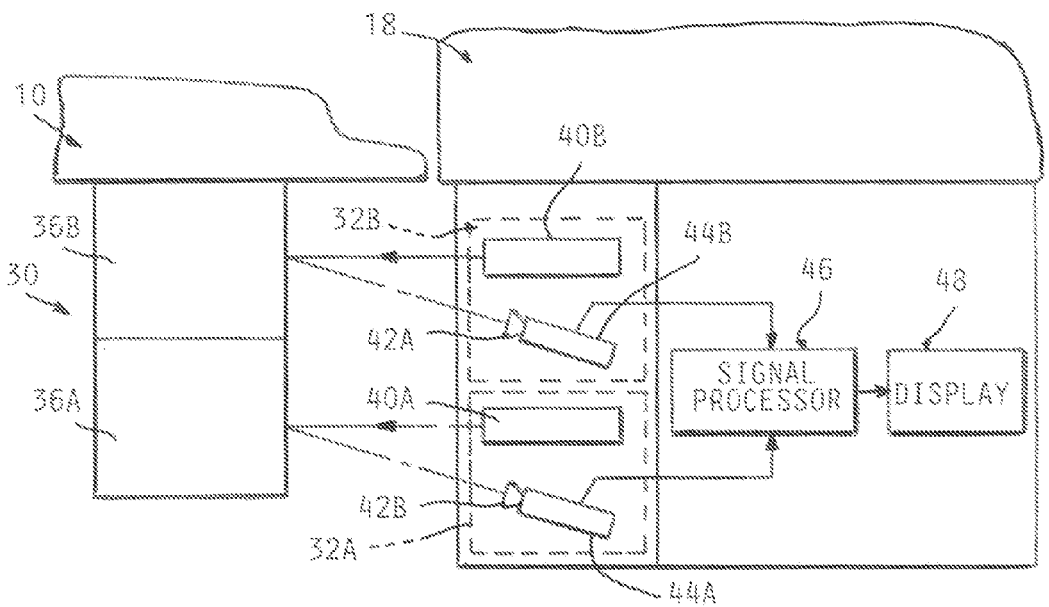
FIG. 14 is an enlarged top view of the reference target and dual laser distance sensor unit shown in FIG. 13 installed on an auto door and adjacent body, with a diagrammatic representation of the major components of the dual laser sensor unit.

FIG. 14 shows further details of the sensor unit 34, with each sensor 32A, 32B including a laser source 40A, 40B directing a laser beam at a respective surface 36A, 36B.

The reflections are viewed through optics 42A, 42B and the image detected by CCD or COM detectors 44A, 44B.

The signals are processed in a signal processor 46 and the results sent to a display 48 or to a central computer, memory, etc., for recording and use or reference.

Thus, the change in distances between the sensors 32A, 32B and the surfaces 36A, 36B caused by vertical motion allows computation of the degree of misalignment of the striker 14 and latch 12 in the above embodiment.

Figure 15A:
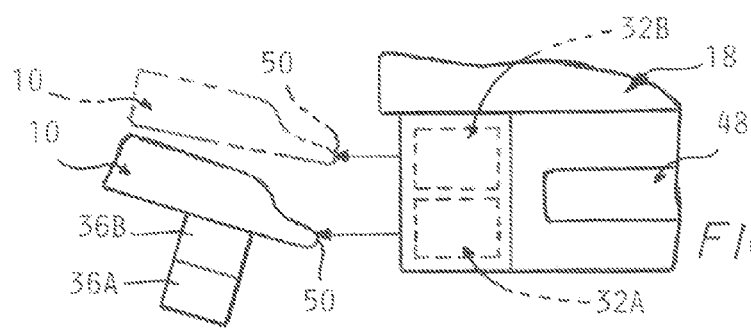
FIG. 15A is a top view of the installed reference target and dual laser sensor unit as shown in FIGS. 13 and 14 in which the door closing speed is being determined by imaging the door edge as the door approaches the closed position.
Figure 15B:
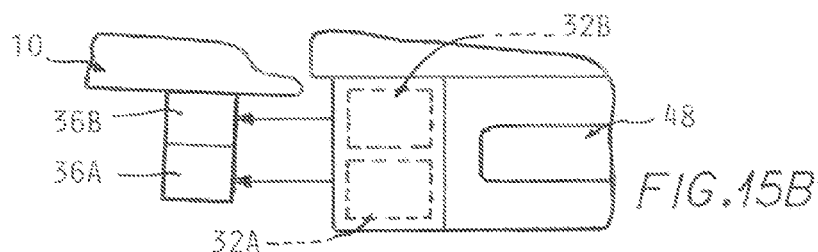
FIG. 15B is a top view of the reference target successively passing the laser distance sensors to determine the extent of any misalignment of the striker and latch as the door is being fully closed.

The side by side arrangement of the laser sensors 32A, 32B allow the speed of the door 10 to also be determined as shown in FIGS. 15A, 15B.

As the door 10 swings shut, the time for a door edge feature 50 to move successively past the two sensors 32A, 32B can be determined and from that elapsed time, the speed of closing of the door 10 can be computed as described in the copending application Ser. No. 12/971,009 referenced above.

This can be numerically displayed in display 48 and/or electronically recorded for later. Thus, both tests can be carried out by the same arrangement.

The invention claimed is:

1. An arrangement for measuring the degree of misalignment between a door latch opening on a car door and a fixed striker comprising:
a reference target mounted on said car door, said reference target formed with a pair of target surfaces oppositely inclined from the vertical;
a dual laser distance sensor unit having two laser distance sensors each aimed at a respective target surface, each laser sensor generating signals corresponding to the distances to an associated target surface as said car door swings to a closed latched position, said target surfaces configured to vary said distances in proportion to vertical movement of said door latch and fixed striker induced by said door latch opening and striker misalignment; and
a signal processor receiving said signals corresponding to said distances and producing a signal corresponding to the degree of misalignment between said door latch opening and said fixed striker.

2. The arrangement according to claim 1 wherein said target surfaces are both planar with one extending up from an end nearest to an aligned laser distance sensor and the other extending down from an end nearest to an aligned laser distance sensor.

3. The arrangement according to claim 2 wherein said laser distance sensors and said target surfaces are stacked vertically and aligned with each other.

4. The arrangement according to claim 2 wherein said laser distance sensors are arranged side by side to each other and said surfaces are also each arranged side by side to each other and in alignment with a respective laser distance sensor.

5. The arrangement according to claim 4 wherein said laser distance sensors successively detect a feature on an edge of said car door as said car door moves past said dual laser distance sensor unit prior to said reference target passing said dual laser distance sensor unit and said signal processor determines the speed of closing of said car door from the time between successive detections of said feature by said laser distance sensors.

6. The arrangement according to claim 1 wherein said dual laser distance sensor unit includes a display numerically displaying values of said degree of misalignment of said door latch opening.

7. The arrangement according to claim 1 wherein said striker is fixed to a portion of a car body adjacent a car door opening and wherein said dual laser distance sensor unit is detachably attached to said car body adjacent said opening.

8. The arrangement according to claim 2 wherein said dual laser distance sensor unit is mounted on a separate support.

9. A method of determining the degree of misalignment between a latch opening mounted to a car door on a car body and a fixed striker of an automobile door latch mechanism comprising mounting a reference target to said car door, said reference target having a pair of target surfaces inclined to the vertical in opposite directions, aiming a respective laser distance sensor at each target surface so as to impinge points across an aligned surface as said for door moves to a closed condition whereat said latch mechanism is fully engaged so as to sense any increase and decrease in distances between points of impingement each target surface of a respective laser distance sensor from said respective laser distance sensor of a laser beam included in each laser distance sensor as said car door closes to thereby detect the extent of vertical movement of said car door caused by misalignment of said door latch opening and said striker and generating corresponding signals, and determining therefrom the extent of said misalignment and generating corresponding signals.

10. The method according to claim 9 further including numerically displaying said signals corresponding to the extent of said misalignment of said latch opening and said striker with a display.

11. The method according to claim 10 including combining said laser distance sensors into a dual laser distance sensor unit and also locating said display on said dual laser sensor distance unit.

12. The method according to claim 11 further including mounting said dual laser distance sensor unit to said car body adjacent said car door.

13. The method according to claim 9 including stacking said laser distance sensors vertically and also locating said target sensor surfaces to be vertically aligned to simultaneously impinge both of said target surfaces with a laser beam from each laser distance sensor as said car door moves to a closed position.

14. The method according to claim 9 including locating said reference target and said laser distance sensors side by side.

15. The method according to claim 14 also using said laser distance sensors to sense when a feature on an edge of said car door moves past each successive laser distance sensor and determining the closing speed of movement of said car door from the time taken to move said feature from a position opposite one laser distance sensor to a position opposite the other laser distance sensor whereby both the extent of misalignment of said latch opening and said fixed striker and said closing speed of said door are determined using said laser distance sensors.

* * * * *